(12) United States Patent
Hjelm et al.

(10) Patent No.: US 8,547,950 B2
(45) Date of Patent: Oct. 1, 2013

(54) SQUARING LOSS INHIBITION FOR LOW SIGNAL LEVELS IN POSITIONING SYSTEMS

(75) Inventors: Mikael Hjelm, Vasteras (SE); Joakim Landmark, Uppsala (SE); Andreas Schmid, Duisburg (DE)

(73) Assignee: Infineon Technologies AG, Neubiberg (DE)

( * ) Notice: Subject to any disclaimer, the term of this patent is extended or adjusted under 35 U.S.C. 154(b) by 958 days.

(21) Appl. No.: 12/434,802

(22) Filed: May 4, 2009

(65) Prior Publication Data
US 2010/0279732 A1 Nov. 4, 2010

(51) Int. Cl.
*H04B 7/216* (2006.01)

(52) U.S. Cl.
USPC ............ 370/342; 370/328; 370/343; 370/345

(58) Field of Classification Search
USPC ......... 370/320, 342, 328, 343, 345; 342/357, 342/357.02, 357.06; 375/147, 142; 455/456; 368/14
See application file for complete search history.

(56) References Cited

U.S. PATENT DOCUMENTS

| | | | | |
|---|---|---|---|---|
| 5,883,594 A | * | 3/1999 | Lau | 342/357.63 |
| 6,201,497 B1 | | 3/2001 | Snyder et al. | |
| 6,327,473 B1 | * | 12/2001 | Soliman et al. | 455/456.1 |
| 6,411,811 B2 | | 6/2002 | Kingdon et al. | |
| 6,661,371 B2 | | 12/2003 | King et al. | |
| 7,382,315 B1 | | 6/2008 | Stevens et al. | |
| 7,876,738 B2 | * | 1/2011 | Akopian et al. | 370/342 |
| 7,903,600 B2 | * | 3/2011 | Yeh et al. | 370/320 |
| 2002/0053988 A1 | * | 5/2002 | Chung | 342/357.06 |
| 2005/0185700 A1 | * | 8/2005 | Pietila et al. | 375/147 |
| 2008/0273578 A1 | * | 11/2008 | Brenner et al. | 375/142 |
| 2009/0034372 A1 | * | 2/2009 | Fujisawa | 368/14 |

OTHER PUBLICATIONS

Shanmugam, S., et al., "Design of Short Synchronization Codes for Use in Future GNSS System", International Journal of Navigation and Observation, Article ID 246703, vol. 2008, Feb. 7, 2008 Hindawi Publishing Corporation. 14 pages.
Gaggero, P.O., et al., "Ultra-stable Oscillators: Limits of GNSS Coherent Integration", ION GNSS Conference, Session $AB_2$, Sep. 16-19, 2008, pp. 1-11.
Lachapelle, G., "GNSS Indoor Location Technologies", Journal of Global Positioning Systems, 2004, vol. 3, No. 1-2, pp. 2-11.
Zheng, B., et al., "GPS Software Receiver Enhancements for Indoor Use", Proceedings of ION GNSS (Session C3), Sep. 13-16, 2005, pp. 1-5.
Kovář, P., et al., "Augmentation Methods for Gnss Integrity and Precision Enhancement in Difficult Environment", ENC-GNSS 2007, European Navigation Conference, May 29-31, 2007, Geneva, Switzerland, pp. 107-114.
Avila-Rodriguez, J.A., et al., "How to Optimize GNSS Signals and Codes for Indoor Positioning", ION GNSS $19^{th}$ International Technical Meeting of the Satellite Division, Sep. 2006, Munich, 9 pages.
Skournetou, D., et al., "Indoor Location Awareness Based on the Non-Coherent Correlation Function for Gnss Signals",Finnish Signal Processing Symposium, FINSIG 2007, Oulu, Finland, Aug. 30, 2007, 6 pages.
Ioannides, R., et al., "Coherent Integration of Future Gnss Signals", $19^{th}$ International Technical Meeting of the ION GNSS, Sep. 26-29, 2006, pp. 1253-1268.
Shanmugam, S., et al., "Design of Short Synchronization Codes for Use in Future GNSS System", International Journal of Navigation and Observation, Article ID 246703, vol. 2008, Feb. 7, 2008 Hindawi Publishing Corporation, 14 pages.
Gaggero, P.O., et al., "Ultra-stable Oscillators: Limits of GNSS Coherent Integration", ION GNSS Conference, Session $A2_B$,Sep. 16-19, 2008, pp. 1-11.

* cited by examiner

*Primary Examiner* — Hassan Kizou
*Assistant Examiner* — Toan Nguyen
(74) *Attorney, Agent, or Firm* — Slater & Matsil, L.L.P.

(57) ABSTRACT

Embodiments related to acquisition, detection, and processing of a high-frequency signal in a global positioning system are described and depicted.

13 Claims, 9 Drawing Sheets

SQUARING LOSS INHIBITION FOR LOW SIGNAL LEVELS IN POSITIONING SYSTEMS

TECHNICAL FIELD

An embodiment of the invention relates generally to a receiver for detection and processing of a satellite navigation signal, and a related method.

BACKGROUND

Satellite navigation has become a prerequisite for a wide range of electronic positioning devices that include products intended for vehicular and portable applications. As a result, deep urban and indoor areas are becoming increasingly important for emerging satellite navigation designs. Attenuation, shadowing, and multipath fading effects in urban canyons and indoor areas frequently degrade the received satellite navigation signals. Signal obstructions in these environments often lead to limited service availability.

A navigation system in use today for determining a position of a mobile radio receiver may utilize the satellite-based GPS ("Global Positioning System") system, and in the near future, the European Galileo system. The terms "GPS" and "Galileo" are used interchangeably herein, and will also be referred to herein as a GNSS ("global navigation satellite system"). Both systems work similarly, each employing about 24 to 31 orbiting satellites, each satellite with accurately known position and time that transmit a signal with a time stamp that indicates when the signal was sent from the satellite. In order to be able to compute the position of the mobile receiver, satellite clocks in each system are accurately synchronized to a common time reference. The mobile receiver calculates its position by the following (simplified) steps: First the time stamp of at least four satellites is extracted from received signals by the mobile receiver, and the time of arrival of the time-stamped message is recorded. The distance from each satellite to the mobile receiver is calculated by comparing the respective time stamp with its arrival time, using the accurately known propagation velocity of the radio signal. The position of each satellite can be accurately determined at any instant in time by the mobile receiver using satellite ephemeris data, which is regularly updated and transmitted by the satellites. Thus, the distance to at least three of the satellites can be calculated by the mobile receiver position using triangulation. However, the clock in the mobile receiver may not be accurately synchronized with the synchronized clocks in the satellites. A time-stamped signal received from a fourth satellite by the mobile receiver is generally used to compensate clock uncertainty in the mobile receiver. To improve accuracy even further in determining the location of the mobile receiver, perturbation effects operative on the received signal such as atmospheric effects, earth rotation, relativity, etc., are typically included in the computation of the mobile receiver location.

GPS satellites transmit on carrier frequencies of 1.57542 GHz (for the GPS L1 signal) and 1.2276 GHz (for the GPS L2 signal). The GPS carrier is modulated with a spread-spectrum technique employing a pseudorandom code with a bit rate of 1.023 Mchip/s (megachips per second) for the coarse acquisition ("C/A") GPS code, and 10.23 Mchip/s for the precise (P) GPS code. Thus, roughly 100-2000 carrier cycles, depending on the GPS signal, comprise one spread-spectrum chip. Since the speed of light (in a vacuum) is about 299,792, 458 m/s, the "length" of one chip at 1 Mchip/s is about 300 m, and at 10 Mchip/s, about 30 m. This means that in order to obtain good accuracy in the position computation, the arrival time must be determined by the mobile receiver within a reasonably small fraction of a chip. Existing products are able to determine position with accuracy well better than 10 m when there is sufficiently high signal-to-noise ratio, confirming that it is possible to determine the time of arrival of the received signal with high accuracy.

Practical satellite navigation applications thus require Galileo/GPS receivers with high positioning accuracy at low signal-to-noise ratio. This is particularly the case for applications in deep urban and indoor environments where envelopes of buildings and vehicles attenuate the signals transmitted by the satellites, which are already quite weak at about −158.5 dBW when unobstructively received on the earth's surface. The result is a degrading of positioning accuracy in urban and indoor environments in view of user expectations or system requirements.

Enhanced reception sensitivity is a key success factor for satellite navigation in the mass consumer market. Galileo/GPS receivers with higher acquisition and detection sensitivity would enable more widespread utilization of satellite navigation.

Thus, the design of an improved Galileo/GPS receiver that provides improved signal acquisition and detection and, correspondingly, improved positioning availability and accuracy, particularly in an environment of low received signal-to-noise ratio, would address an unanswered application need.

SUMMARY OF THE INVENTION

In accordance with an exemplary embodiment, a receiver configured to coherently integrate a CDMA signal in a coherent integration stage and a related method are provided. In an embodiment, the receiver is a global navigation satellite system receiver such as a Galileo or GPS receiver. The receiver includes a data source configured to produce a replica of a data bit sequence modulated on a CDMA ("code division multiple access") signal, and a coherent integration stage configured to coherently integrate the CDMA signal over a first period of integration employing the replica of the data bit sequence. In an embodiment, the data source is configured to produce the replica of the data bits employing a signal received from an external wireless source modulated with the data bits. In an embodiment, the replica of the data bit sequence modulated on the CDMA signal is produced in the receiver employing assist data received from an external wireless source. The assist data might include a satellite almanac and a timing reference.

In a further embodiment, a downconversion stage in the receiver is configured to convert the CDMA signal to a baseband signal, and a frequency estimation stage is configured to produce a frequency correction signal for a local oscillator to produce a frequency-corrected local oscillator signal. The coherent integration stage is configured to coherently integrate the CDMA signal over a second period of integration employing the replica of the data bit sequence modulated on the CDMA signal and the frequency-corrected local oscillator signal. In an embodiment, the coherent integration stage is configured to coherently re-integrate the CDMA signal over the first period of integration employing the replica of the data bits and the frequency-corrected local oscillator signal.

In a further embodiment, a receiver includes a modulation data overlay source configured to produce real-time modulation data for a CDMA signal in a selected GNSS ("global navigation satellite system") subframe of the CDMA signal. The real-time modulation data is produced employing previously stored satellite data or assist data, wherein producing the real-time modulation data is initiated upon receipt of a timing signal from an external wireless source. The receiver includes a coherent integration stage configured to coherently integrate the CDMA signal over a first period of integration employing the real-time modulation data. The previously stored satellite data or assist data may include almanac data. The previously stored satellite data or assist data might include previously stored satellite modulation data from a previously transmitted Galileo or GPS ("Global Positioning System") subframe.

In an embodiment, the previously stored satellite modulation data includes data received from the external wireless source with an external wireless source carrier frequency different from a carrier frequency of the CDMA signal. In an embodiment, the selected GPS subframe includes at least one of GPS subframe 4 and GPS subframe 5.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

Figure 1:
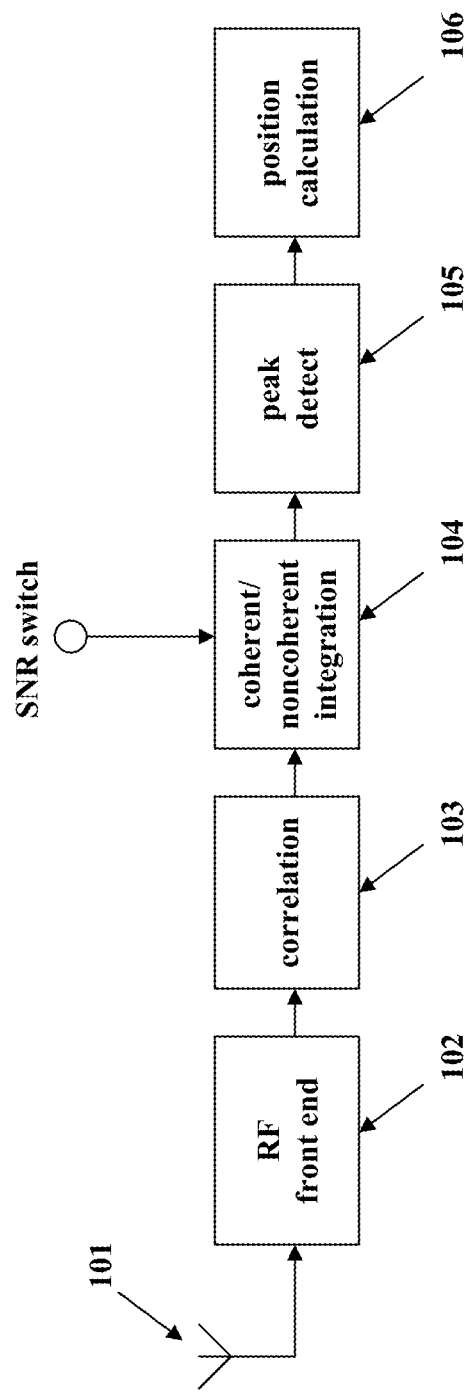
FIG. 1 illustrates a block diagram of a Galileo/GPS receiver employing coherent and noncoherent integration techniques that are selectively enabled by a logical switch responsive to a signal-to-noise ratio of a received signal.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a process and method to provide improved signal acquisition and detection capability for an RF (radio frequency) signal such as a satellite navigation signal.

An embodiment of the invention may also be applied to other signal-detection arrangements in a high-frequency receiver, for example, to a cellular telephone receiver. Further signal-detection arrangements can be constructed and applied using processes introduced herein in different contexts using inventive concepts described herein, for example, a signal detection arrangement employed to detect a high-frequency modulated carrier signal that might be transmitted over an air or a hard-wired channel to a receiver in a local area network, or to a television broadcast receiver.

Coherent integration in signal detection refers to processing both the magnitude and phase of a received signal. Coherent integration can be performed by separately integrating signed real and imaginary components of a signal represented in the complex plane, for example, by separately integrating signed in-phase and quadrature signal components. The received signal may be coherently integrated over a limited period of time after downconversion to baseband using a local oscillator that may have a frequency imprecisely tuned to the carrier frequency of the transmitter. For example, the local oscillator may have a frequency selected from a frequency search table that is used in the process of acquiring a received global navigation satellite signal. Such global navigation satellite systems include the Galileo and GPS systems, and applications of embodiments described herein are not restricted to these systems.

The term coherent integration may include processing of a signal with a "multiply and accumulate" process, wherein a function representing an inverse characteristic of a spread spectrum modulation is multiplied with a received signal. The inverse characteristic may include an inverse of a time response of a filter at either end of the communication path, or an inverse characteristic of the communication path between a satellite and the receiver. The multiplication may include multiplication by a function with a complex value, such as a complex-valued modulating signal constellation. A matched filter as generally used in a receiver may also provide a coherent integration process. Systems that employ coherent integration include, without limitation, satellite navigation receivers, mobile communication receivers, satellite communication receivers, local area network receivers, and radio and television receivers.

A long coherent integration period for signal detection in a GPS receiver leads to higher reception sensitivity. High reception sensitivity is important for positioning accuracy in an environment with a low signal-to-noise ratio, particularly in an environment with a non-line-of-sight communication path. Reception sensitivity can be enhanced by about 3 dB when the period of coherent integration is doubled. The maximum coherent integration period is, however, limited by the frequency offset of a local oscillator frequency signal employed for downconversion in the GPS receiver with respect to the frequency of the received carrier.

For positioning in deep urban and moderate indoor environments where enhanced reception sensitivity is a prerequisite for a signal that is only about −158.5 dBW in an unobstructed environment, noncoherent integration has become the state-of-the-art signal detection technique. Noncoherent integration generally refers to processing only the magnitude of a received signal. As opposed to very long coherent integration intervals which require accurate matching of the frequency of the local oscillator with the frequency of the received carrier, noncoherent integration can sustain a certain degree of local oscillator frequency deviation.

A known use of coherent integration is for initial signal acquisition, since modulation data from the satellite is unknown. If coherent integration would be used, integration across a changed modulation data bit, such as a binary phase-shift keyed modulation data bit changing from "1" to "0," as employed in the GPS system, would produce a null or small integration result due to the inverted phase across a data bit boundary of the modulated signal. If coherent integration would be used in highly obstructed urban or indoor communication environments, a 20 ms period of integration, which corresponds to one modulation data bit at the GPS modulation frequency of 50 Hz, would provide insufficient signal-to-noise ratio for reliable signal acquisition and detection. Thus, a technique to provide coherent integration beyond a 20 ms interval is an essential element in such highly obstructed communication environments.

Figure 2:
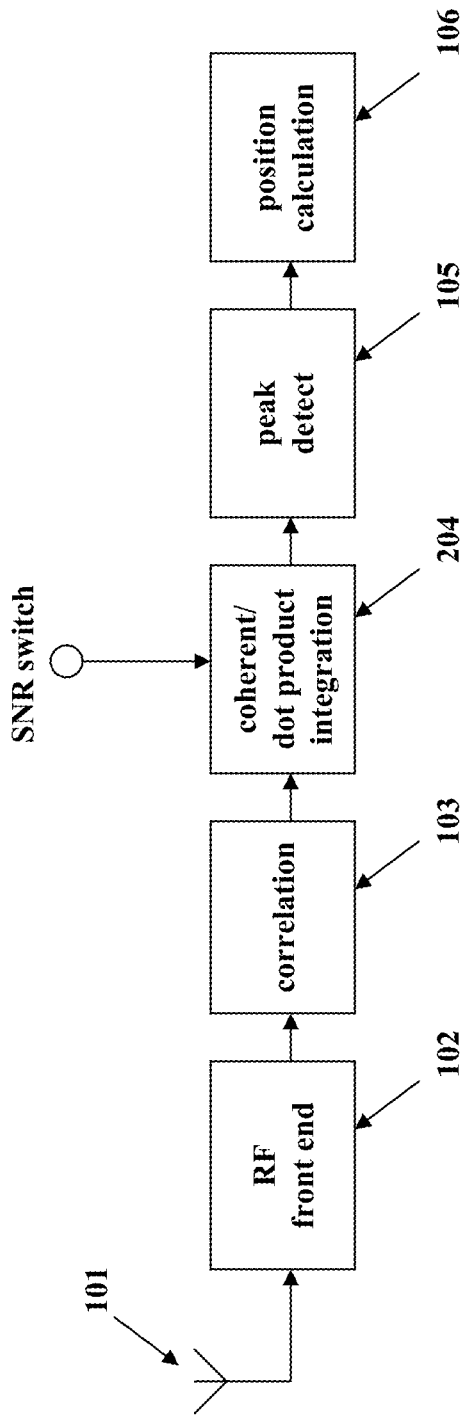
FIG. 2 illustrates a block diagram of a Galileo/GPS receiver employing coherent and dot-product integration techniques that are selectively enabled by a logical signal-to-noise ratio switch.

Turning now to FIG. 1, illustrated is a block diagram of a Galileo/GPS receiver employing coherent and noncoherent integration techniques that are selectively enabled by a logical switch responsive to a signal-to-noise ratio of a received signal. And in FIG. 2, illustrated is a block diagram of a Galileo/GPS receiver employing coherent and dot-product integration techniques that are selectively enabled by a similar logical signal-to-noise ratio switch. In each receiver as illustrated in FIGS. 1 and 2, a signal is received by antenna 101, which is coupled to an RF ("radio frequency") front end 102 that amplifies, downconverts, and filters the received signal. The correlation block 103 then despreads the signal to form a complex (sampled) digital baseband signal. The following integration block (coherent/noncoherent integration block 104 as illustrated in FIG. 1 or coherent/dot product integration block 204 as illustrated in FIG. 2) produces a decision statistic for the signal that is detected in the following peak detect block 105. The resulting data is then employed in the position calculation block 106 to determine a physical position for the Galileo/GPS receiver.

Since noncoherent integration integrates only the magnitude of the data bits, it avoids data-bit cancellation when a modulation data bit changes. Noncoherent integration, however, causes a reduction of signal-to-noise ratio compared to coherent integration, called "squaring loss." In a low signal-to-noise ratio situation, the noise energy is also squared, which reduces the signal-to-noise ratio gain of the noncoherently integrated signal.

Thus, a drawback of noncoherent integration is that it cannot improve the reception sensitivity as efficiently as coherent integration as the integration period is increased. Doubling a noncoherent integration period can improve reception sensitivity by about 1.5 dB. Doubling a coherent integration period, on the other hand, improves reception sensitivity by about 3 dB. This is a significant drawback of noncoherent integration, since extended noncoherent integration delivers only half the gain of comparably extended period of coherent integration.

Another current solution includes dot product integration, wherein integration is performed just long enough to compensate for the squaring loss. The dot product still has substantial loss at low signal-to-noise ratio levels, and the longer integration period consumes power, which is a disadvantage in a battery-operated device.

In embodiments described herein, decoded satellite data bits are repeated by a satellite data slave transmitter at a frame repetition rate, i.e., once per 20 ms, or an integer multiple thereof. In the GPS system, the modulation data rate is 50 Hz, corresponding to the GPS frame repetition period of 20 ms. Transmission of decoded satellite data bits is done by satellite data slave transmitters located at particularly difficult reception locations for a GPS signal, i.e., in indoor facilities, tunnels, trains, or similar structures. The slave transmitters are connected to a GPS positioning receiver located such that it can decode GPS data with an unobstructed communication path to the satellites.

Figure 3:
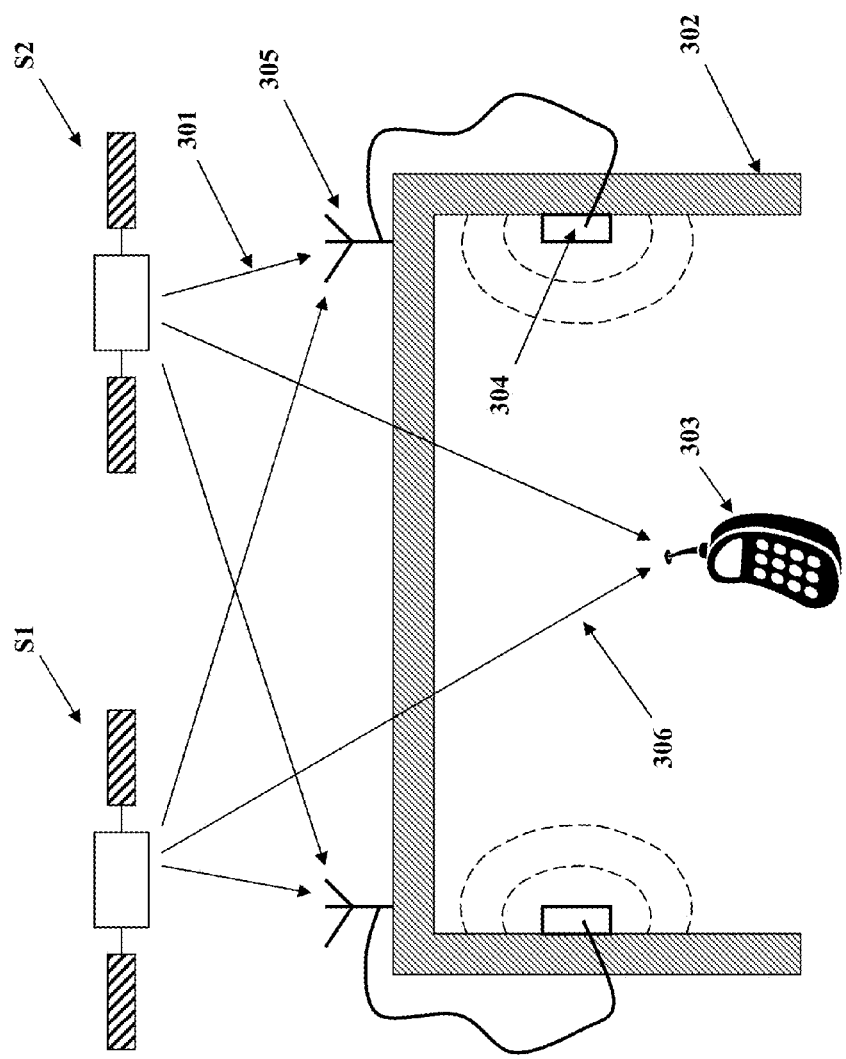
FIG. 3 illustrates a representative drawing showing a mobile Galileo/GPS receiver in an unobstructed location receiving attenuated satellite signals and data from slave transmitters, representing an environment for application of an embodiment.

Turning now to FIG. 3, illustrated is a representative drawing showing a mobile Galileo/GPS receiver in an unobstructed location receiving attenuated satellite signals and locally transmitted assist data from slave transmitters, representing an environment for application of an embodiment. As illustrated in FIG. 3, a Galileo/GPS receiver 303 receives weak signals 306 attenuated by a structure 302 from satellites S1 and S2. Direct line-of-sight satellite signals, such as line-of-sight signal 301, are received by slave antennas, such as slave antenna 305 that are coupled to satellite data slave transmitters, such as satellite data slave transmitter 304. The slave transmitters send decoded satellite data bits corresponding to the data bits that are modulated on the signal transmitted by the Galileo or GPS satellite such that the latency of the decoded bits received at a Galileo/GPS receiver from the slave transmitter relative to the signal received from the Galileo/GPS satellite can be substantially known or determined. In an embodiment, the slave transmitters send decoded satellite data bits corresponding to and substantially synchronized with the satellite signal data bits received at a Galileo/GPS receiver. In this way a Galileo/GPS receiver located in a weak signal reception area can store correlation results in a signal detection process until information is received via the satellite data slave transmitters indicating whether a received bit is a one or a zero. For example, if the received data bit was a zero, the correlation result is multiplied with −1 before integration, and if it was a one, the result is integrated unchanged. The need for the assist data in the signal detection process that is an integral part of A-GPS in 3GPP can in some embodiments also be eliminated, since the same information content can be derived from the received bit-by-bit data modulation from the secondary slave transmitter channel.

The slave transmitters can utilize any medium for transmission of the decoded data. The bits transmitted by a slave transmitter are in one embodiment transmitted on a frequency band different from all Galileo and GPS carrier signals, such as, e.g., in the form of an FM ("frequency modulated") or PM ("phase modulated") signal, or a signal allocated to a cellular or local area network, or to a broadcast signal. The bits could even be transmitted by terrestrial television or radio broadcast transmitters, provided that their signals can be decoded inside areas expected to be utilized by a Galileo/GPS receiver. In some embodiments, quality of service of the wireless medium utilized by slave transmitters is included to reduce the need for buffers in the positioning Galileo/GPS receiver. The low data rate and the proximity of a slave transmitter to a Galileo/GPS receiver enable reliable repetition of the Galileo or GPS data with known or minimal latency.

The required accuracy for the latency of the bits transmitted by a local slave transmitter can be estimated recalling that the data bit modulation rate is only 50 Hz for the GPS system. The speed of propagation of an RF signal over an air interface is roughly 1 foot per nanosecond. Thus, if a Galileo/GPS receiver and a slave transmitter are separated by about 100 feet, the uncertainty in propagation time over the air interface is roughly 100 ns, or 0.0005% of a 20 ms GPS data bit which, by itself, has insignificant effect on signal acquisition or detection. Thus, if a local slave transmitter retransmits the modulation data with a known retransmission latency, the total latency uncertainty can be small compared to a Galileo or GPS data bit, which would not introduce substantial performance degradation of a satellite signal acquisition and detection process as introduced herein. If the location of the Galileo/GPS receiver is substantially separated from the slave transmitter, further accommodation such as an a priori estimate of the Galileo/GPS receiver location with respect to the slave transmitter may be required to reduce latency uncertainty.

The modulation bits for a particular satellite transmitted by a slave transmitter are in one embodiment transmitted on a designated channel for the particular satellite, enabling a Galileo/GPS receiver to correlate the slave transmitter bit stream with the received signal of a particular satellite.

An advantage of using the data bits transmitted by a slave transmitter is that the squaring loss can be mitigated by the use of coherent integration. This leads to a gain of roughly 1 dB in signal-to-noise ratio per dB of SNR below −150 dBm carrier power. A benefit of the process is that the minimum level of Galileo/GPS signal reception is moved from −160 dBm to −170 dBm carrier power or lower for current top-of-the line products. The integration time and thereby power consumption are accordingly substantially reduced for signals with carrier power below −150 dBm.

Figure 4:
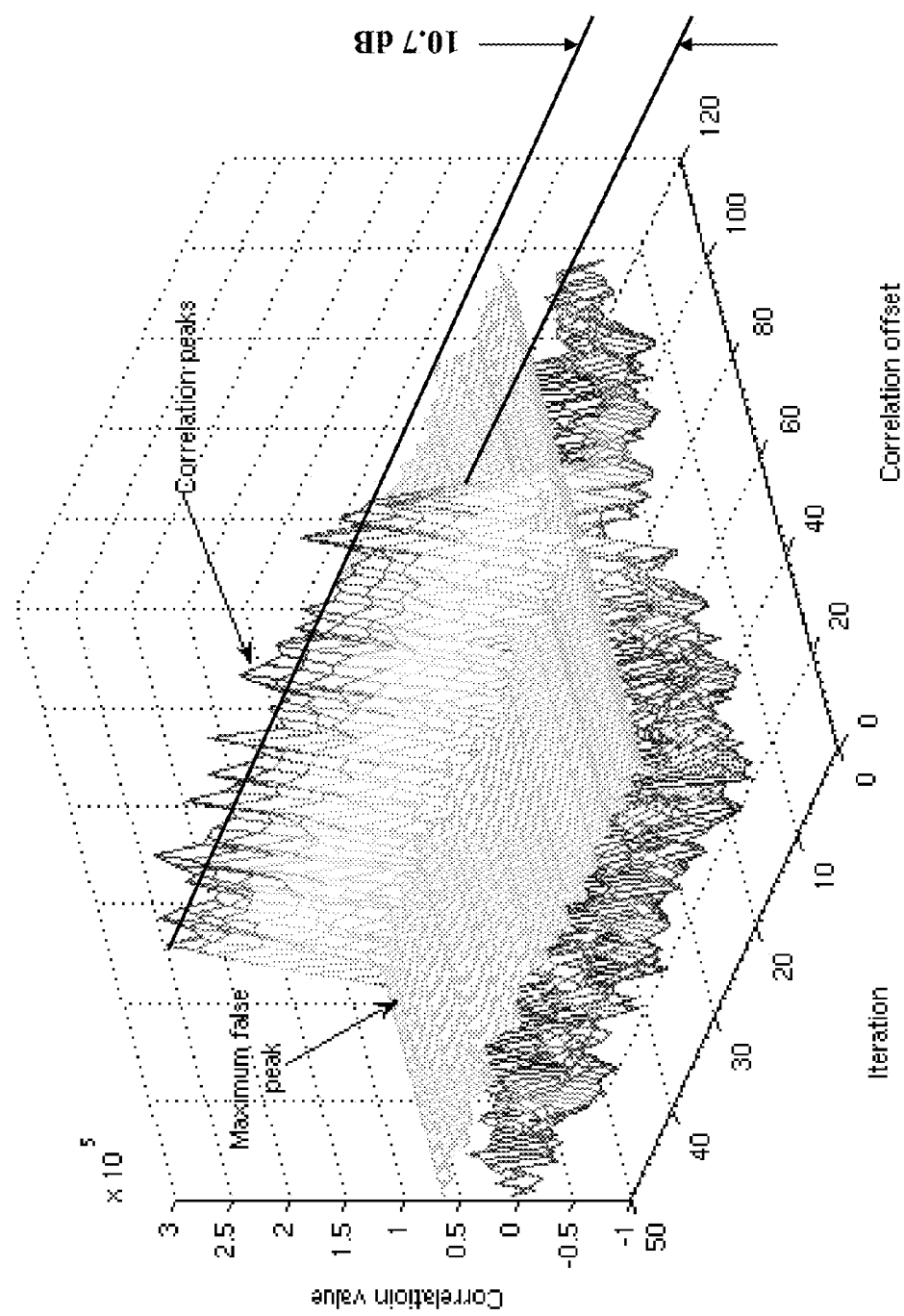
FIG. 4 illustrates a graphical drawing showing integration results of fifty 100-ms coherent integrations utilizing assist data transmitted by a slave transmitter, representing a detector constructed according to an embodiment.

Turning now to FIG. 4, illustrated is a graphical drawing showing integration results of fifty 100-ms coherent integration trials ("Iterations") versus correlation offset time (where "correlation offset" time is expressed roughly in units of a one tenth of a chip interval) utilizing data transmitted by a slave transmitter, representing a receiver constructed according to an embodiment. The ratio of the correct peak to the highest false peak is approximately 10.7 dB.

Figure 5:
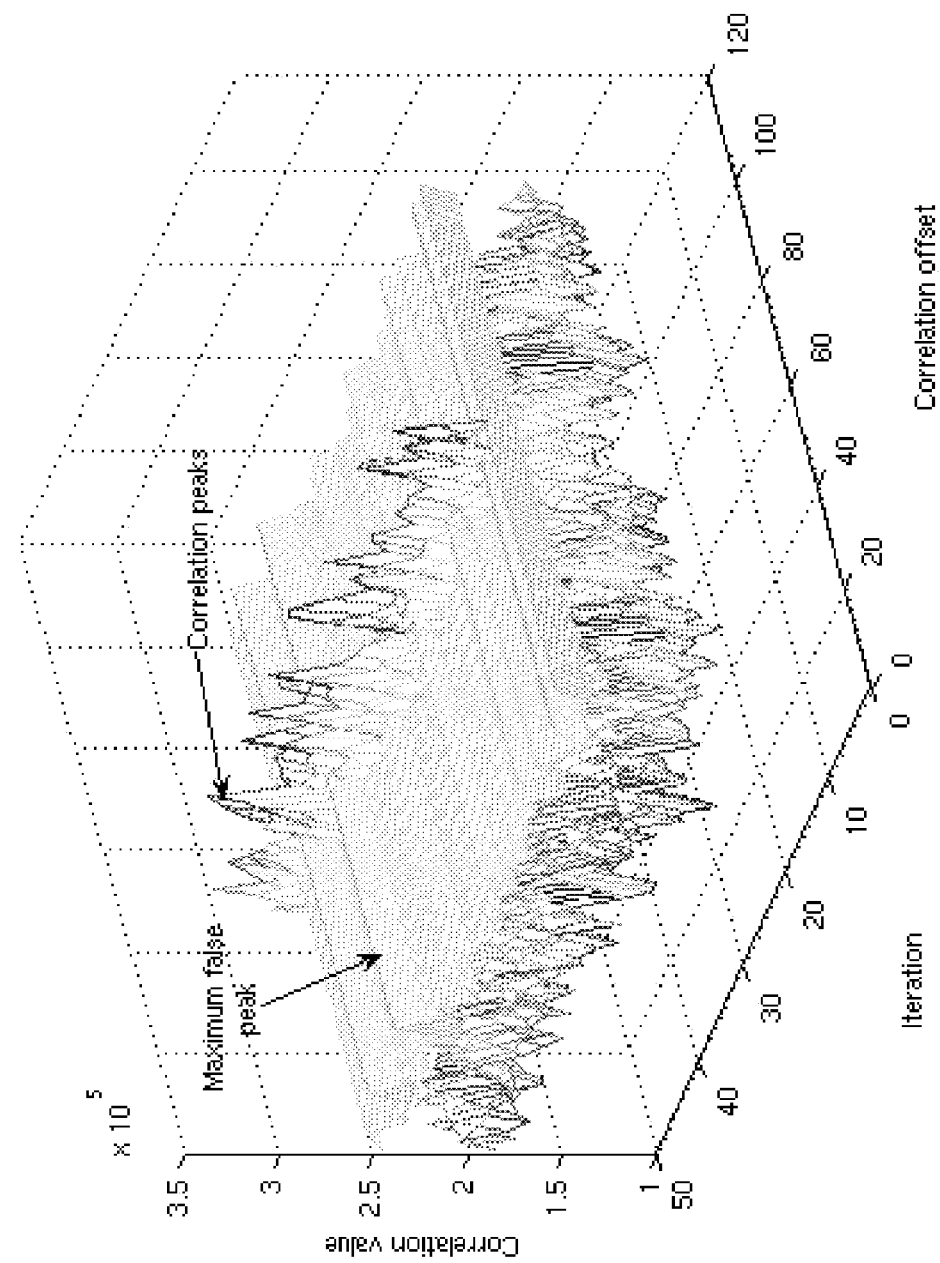
FIG. 5 illustrates a graphical drawing showing integration results of fifty 100-ms noncoherent integrations corresponding to the received signal represented in FIG. 4.

FIG. 5 illustrates a graphical drawing showing integration results of fifty 100-ms noncoherent integration trials corresponding to the received signal represented in FIG. 4. This time the ratio of the correct peak to the highest false peak is only 1.4 dB.

Figure 6:
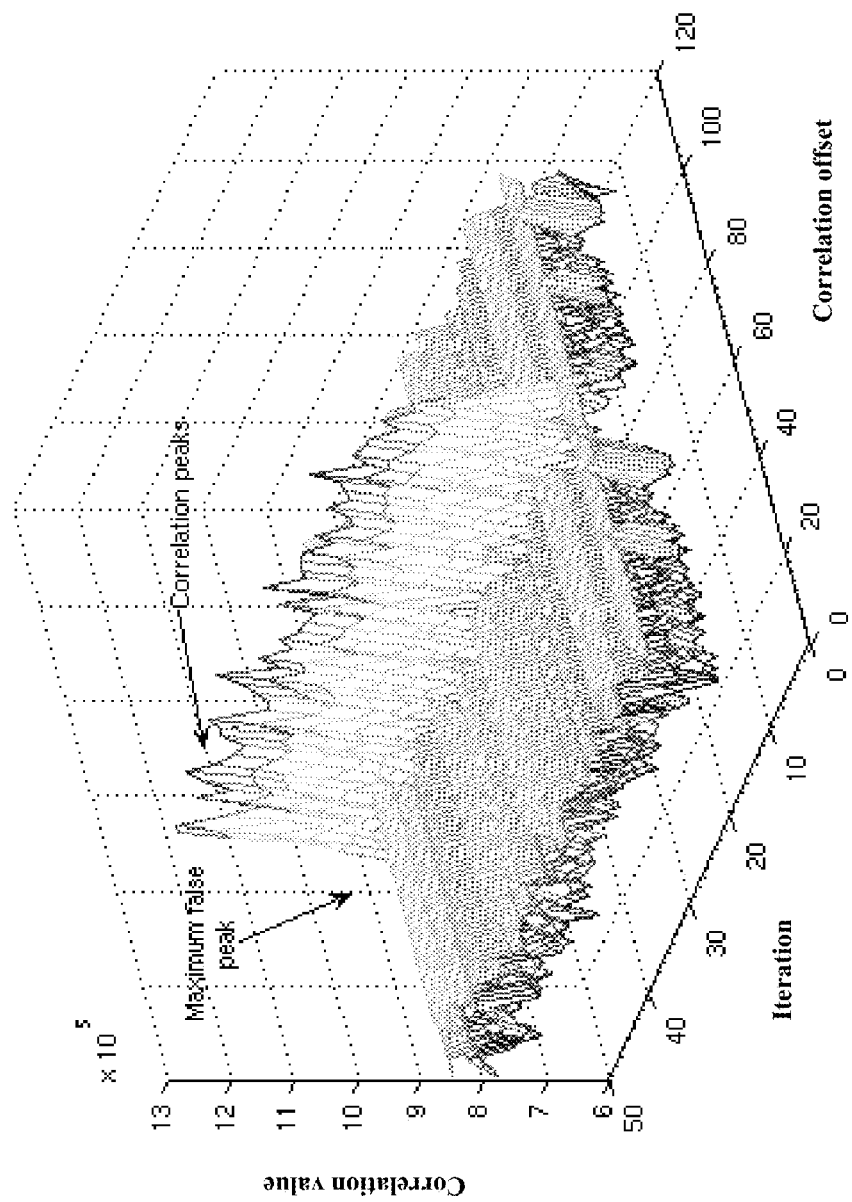
FIG. 6 illustrates a graphical drawing showing integration results of fifty iterations of 397 ms noncoherent integrations corresponding to the received signal represented in FIG. 4.

FIG. 6 illustrates a graphical drawing showing integration results of fifty iterations of 397 ms noncoherent integration trials corresponding to the received signal represented in FIG. 4. The number 397 is the number of noncoherent integrations required to achieve the same signal-to-noise ratio as 100 ms coherent integrations utilizing assist data transmitted by a slave transmitter.

Thus, a Galileo/GPS receiver constructed according to an embodiment advantageously incorporates knowledge of modulation data bits received from a slave transmitter through a secondary communication path to enable the use of coherent integration for signal acquisition and detection at low signal levels. It is to be noted that in order to transmit the modulated data bit to the Galileo/GPS receiver, the slave transmitter must perform a demodulation to extract each modulated data bit.

Figure 7:
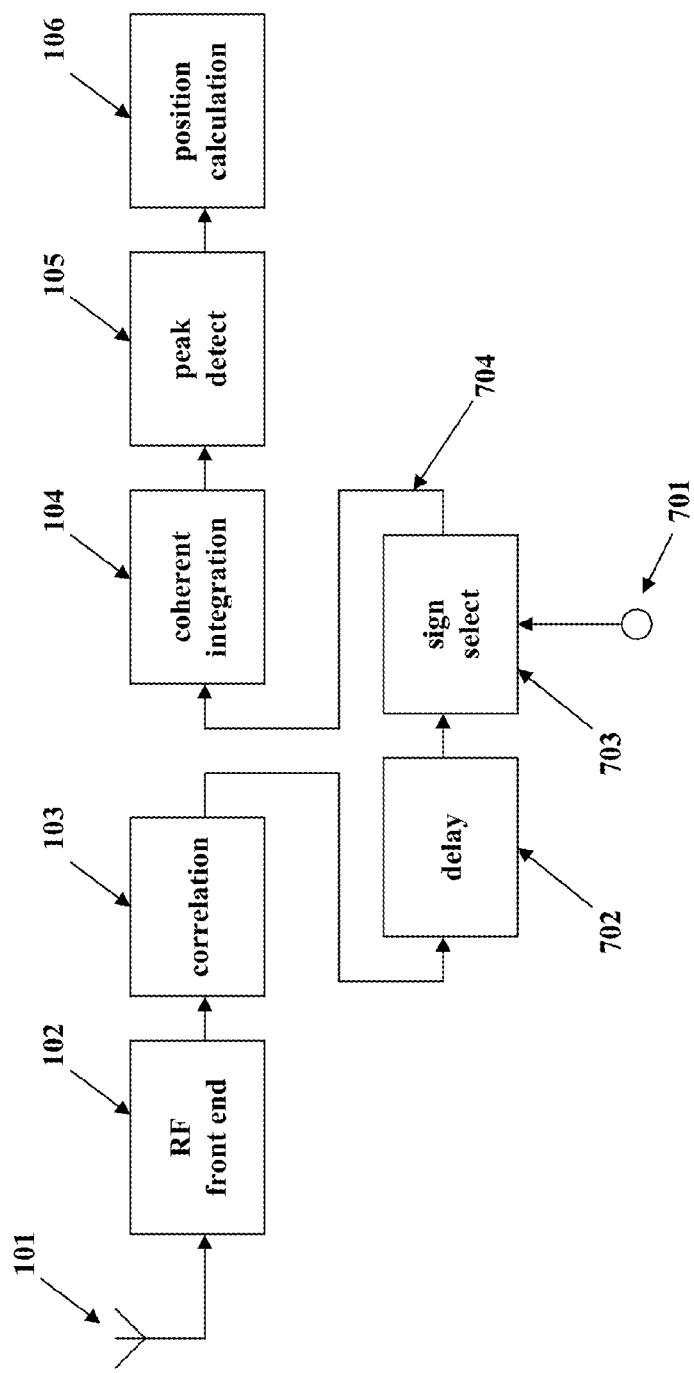
FIG. 7 illustrates a block diagram showing a signal-flow structure for a Galileo/GPS receiver formed with coherent integration that processes data received from a secondary/slave data source, constructed according to an embodiment.

Turning now to FIG. 7, illustrated is a block diagram showing a signal-flow structure for a Galileo/GPS receiver formed with coherent integration that processes data 701 received from a slave satellite data transmitter to provide modulation data overlay 704, constructed according to an embodiment. As illustrated in FIG. 7, a delay block 702 and a sign select block 703 are included in the signal-processing path between the correlation block and the coherent integration block. The delay block 702 provides time alignment of the coherent integration results with the data from the slave transmitter, and may be formed as a memory or register bank, for example, a circular memory arrangement. The sign select block 703 multiplies delayed correlation values produced by delay block 702 with +1 or −1, depending on a modulation data overlay bit received from the slave satellite data source. Noncoherent or dot product integration, nonetheless, may also be included in the receiver for cases wherein satellite data is not available from a slave source, to establish modulation data overlay bit frame edges, or to estimate the delay of the data bits through the channel from the secondary/slave transmitter. FIG. 7 depicts the data path for the received signal once the data bits are available from the slave transmitter, and once the delay is known.

Figure 8:
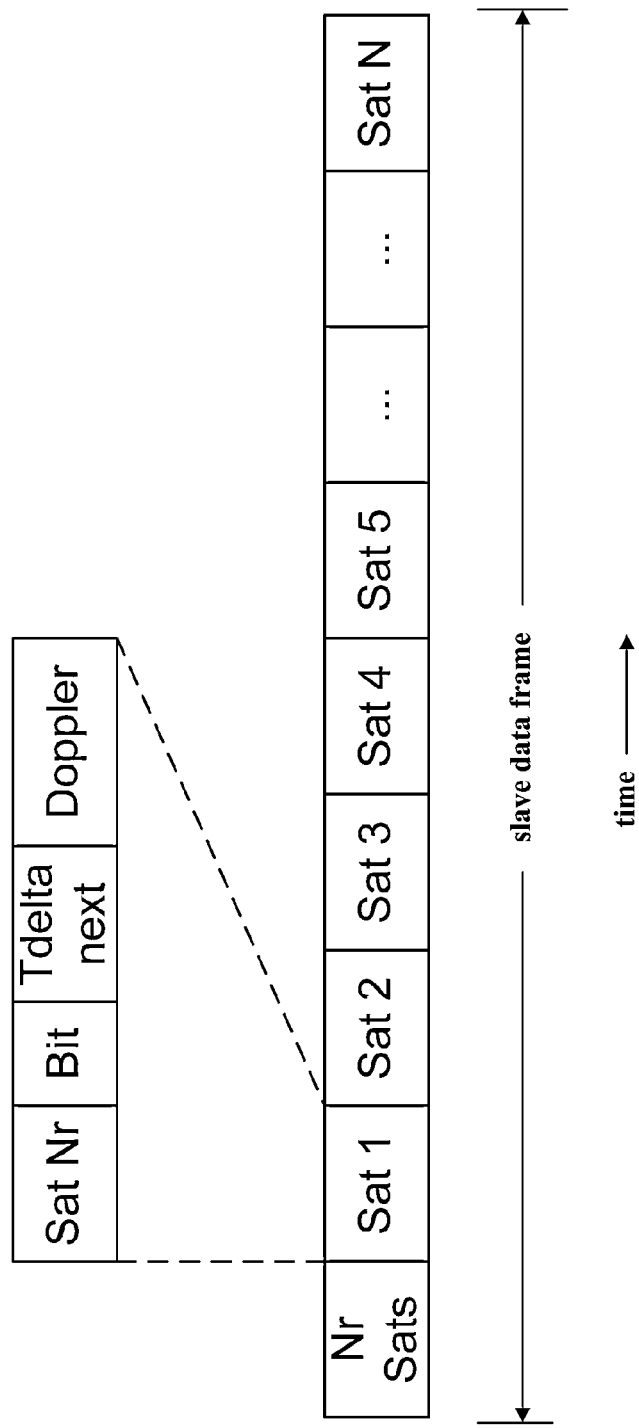
FIG. 8 illustrates a frame format for data transmitted by slave transmitters, constructed according to an embodiment.

Turning now to FIG. 8, illustrated is an exemplary frame format for data transmitted by a secondary/slave transmitter, constructed according to an embodiment. Illustrated in FIG. 8 is one frame per exemplary 20 ms GPS frame repetition period. In an embodiment, the frames for multiple Galileo and GPS satellite signals could be sequentially joined to form a larger frame. The parameters indicated in FIG. 8 include:

Nr Sats: the number of satellite information fields that the frame contains.

Sat i, i=1, . . . , N: the satellite number.

Sat Nr: a number of a particular satellite.

Bit: a modulation data overlay bit value received from a satellite navigation signal.

Tdelta next: the time interval, for example in ms, to the next satellite data frame edge.

Doppler: an optional parameter indicating the Doppler frequency offset of a received Galileo/GPS satellite signal that can be used by the Galileo/GPS receiver to reduce the search space for the correlation peak.

The parameter "Tdelta next" enables the receiver to estimate if the modulation data overlay bit value from a previous data frame might be the bit value that should be used for a corresponding data frame of the next satellite. The Galileo/GPS receiver might receive the bit order of the satellite signal from the slave transmitter in a known but different order than the bit order in which the Galileo/GPS receiver receives the bit order from the satellite. Therefore, the order of the correlation peaks might be different. This datum is optional since the receiver can assume that its position cannot be too far away from the slave transmitter, and therefore it can estimate if the order of the satellite data is reasonable. Optionally, the first Tdelta next field may contain the expected delay from the reception of the satellite data to the first bit transmitted over the wireless interface. This can be used to set the delay illustrated in FIG. 7.

The amount of data in bits per second to be transmitted for a 20 ms slave data frame can be estimated for a maximum of 12 visible satellites to be about (17 bits)·(12 satellites)/(20 ms)=10200 bits/s, or about 10 kbits/s. This data rate is readily achievable with many kinds of short-range wireless transmission today, even with an IR communication channel between the satellite transmitter and the Galileo/GPS receiver.

An embodiment including a modification of the process introduced hereinabove to inhibit squaring loss in satellite navigation receivers will now be described below.

It is recognized, first, that the maximum coherent integration time is limited by residual frequency deviation between the received signal frequency and the frequency generated by a local oscillator in the receiver for downconversion of the received frequency to baseband. This frequency deviation can result from unknown components of satellite and receiver motion, from multipath propagation effects, as well as from frequency fluctuations of the local oscillator. While the motion of the satellites is predictable, the motion of the receiver, multipath propagation effects, and local oscillator fluctuations are unknown a priori. Signal acquisition and detection in an urban or indoor environment may require a coherent integration time that exceeds the 20 ms frame duration of the GPS system.

It is also recognized that the data transmission required to compensate a modulation data overlay requires a certain processing time, which ultimately leads to an intolerable delay uncertainty. Compensation of the modulation data overlay, i.e., determination of the timing of modulating bit transitions, requires a small latency compared to the duration of a frame.

The information required to compensate the modulation data overlay is per se not available in current satellite GPS receivers. Thus, according to one embodiment, a modification of the assistance protocol standards is provided to supply data that can be directly used as described herein.

Embodiments addressing the above are introduced as follows.

First, the limitation of the maximum coherent integration period due to residual frequency deviation can be relieved by splitting the coherent integration period into two or more successive intervals. In the first interval, an initial coherent integration period is used, which is typically 1 ms to 10 ms, with an initial local oscillator frequency. In the second and any further interval, further coherent integration of the resultant pre-detection samples is performed. The result of this two-step or multi-step coherent integration process equals that of an extended coherent integration. The pre-detection samples from the individual intervals are employed for frequency estimation and correction of the frequency of the local oscillator. The uncertainty of the frequency deviation that can be estimated after coherent integration is inversely proportional to the duration of the coherent integration period. With a coherent integration period of 1 ms, the frequency estimation range is +/−500 Hz. It is only +/−10 Hz for 50 ms of coherent integration. The tolerable frequency deviation also decreases proportionally with an increasing duration of the coherent integration. While an acceptable frequency deviation of around +/−300 Hz is often considered acceptable for 1 ms of coherent integration, this reduces to just +/−6 Hz for 50 ms of coherent integration. The pre-detection samples of the initial, short coherent integration process are therefore fed to a frequency estimation unit, which adjusts the downconversion frequency of the local oscillator by means of a loop filter. This frequency compensation, which can be used in both coherent integration intervals, can reduce the frequency deviation to an acceptable level for the extended coherent integration.

Secondly, instead of trying to transmit the modulation data overlay in real time with a known latency via a secondary/slave data transmitter, relevant information that can be used to derive the modulation data overlay such as satellite data or assist data can be supplied in advance to a GPS receiver, for example, from an external wireless source. This enables anticipation and construction of the modulation data overlay by the GPS receiver without significant latency uncertainty when coherently integrating across bit data boundaries.

The GPS data signal is divided into 25 GPS frames, each GPS frame having 1500 bits, hence requiring 20 ms·1500=30 s transmission time for each frame. Each GPS frame is divided into five GPS subframes of 300 bits each. GPS subframes four and five of each GPS frame contain almanac data, which provide coarse coordinates of the entire constellation of GPS satellites. A suggested method to obtain the modulation data is therefore to calculate the almanac bit streams of GPS subframes four and five using available satellite data or using assist data such as specified, without limitation, by the A-GPS protocols by the 3GPP ("Third Generation Partnership Program"), the parallel American/Asian 3GPP2 program, or the OMA ("Open Mobile Alliance") of the cellular telephone industry. Satellite almanac data can be calculated autonomously with sufficient accuracy by extrapolation using orbital models. The synchronization with the bit transitions can be achieved either by a sufficiently accurate time reference supplied as assist data, or by previous acquisition of a GPS satellite signal.

Thirdly, it is recognized that certain information, such as certain almanac data, change infrequently over time. Hence such data can be used to estimate when the associated fourth or fifth subframe starts, and certain data bits can be stored for anticipation of data bits in a later fourth or fifth subframe. Production of real-time modulation data can be initiated upon receipt of an initiation signal from an external wireless source. By calculating or otherwise producing the modulation data of subframes four and five locally in the receiver, existing standardized protocols need not be changed and a new standardization effort can be avoided. The existing assistance protocols from 3GPP, 3GPP2, and OMA provide the input data that is required.

Figure 9:
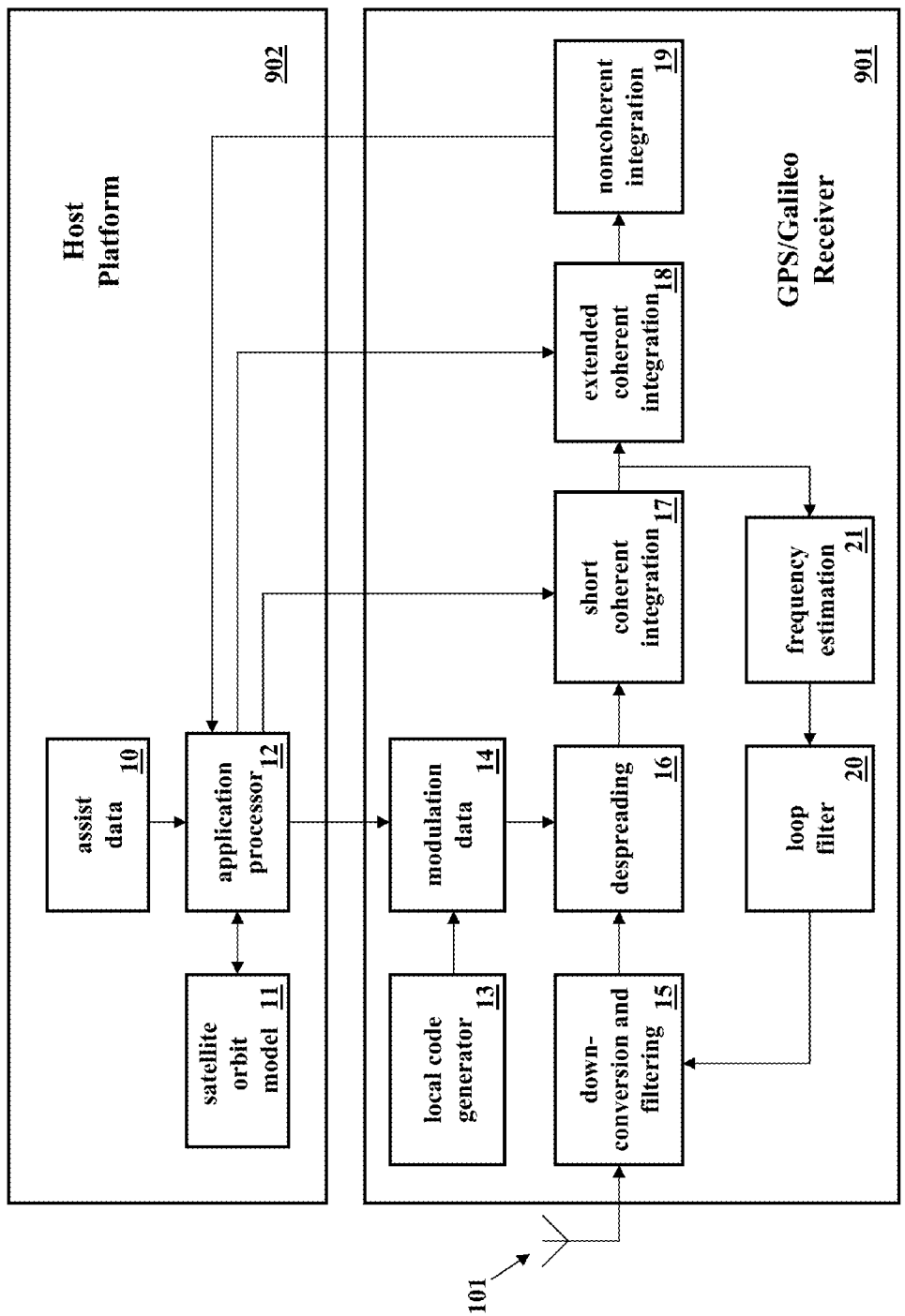
FIG. 9 illustrates a block diagram of portions of a Galileo/GPS receiver including a host platform, constructed according to an embodiment.

Turning now to FIG. 9, illustrated is a block diagram of portions of a satellite signal receiver including a GPS/Galileo receiver 901 coupled to a host platform 902. The satellite signal receiver, constructed according to an embodiment, is configured to provide inhibition of squaring loss by use of an extended coherent integration process for acquisition of a satellite signal. In the GPS/Galileo receiver 901, a satellite signal is received by antenna 101, which is coupled to the downconversion and filtering block 15 that converts the received signal to a complex (sampled) digital baseband signal, and filters the signal. The despreading block 16 multiplies the downconverted signal by a despreading chip sequence with an assumed phase that removes the frequency-spreading chips. The despreading chip sequence is obtained from modulation data block 14 that employs local code generator block 13 to determine the despreading chip sequence for a particular satellite signal that the GPS/Galileo receiver is attempting to acquire. In an arrangement according to an embodiment, modulation data block 14 modulates the despreading chip sequence with a replica of the data bits that are modulated on the Galileo/GPS signal. The replica of the data bits modulated on the Galileo/GPS signal is also referred to herein as a data modulation bit overlay or as modulation data, and is not restricted to Galileo and GPS signals. The real-time data modulation bit overlay may be provided by an application processor 12, i.e., the data modulation bit overlay associated with the presently received satellite signal is provided by the application processor. The modulation data block 14 may also operate independently of application processor 12 and local code generator 13. Next, short coherent integration block 17 accumulates the despread signal samples produced by downconversion by a local oscillator signal with an initial local oscillator frequency and despreading with a local code replica accounting for data modulation over an initial short integration interval. Of course, in practice a search is performed over a range of assumed despreading phases and assumed local oscillator frequencies to acquire a particular satellite signal. A phase error detected in frequency estimation block 21 is employed with loop filter 20 to adjust the frequency of the local oscillator. The adjusted local oscillator frequency is then used in downconversion and filtering block 15 to produce a baseband signal that is employed in extended coherent integration block 18 to provide a longer interval for coherent integration of the received signal. A sequence of extended coherent integration results is summed in noncoherent integration block 19 to produce a decision statistic for the received signal.

The local oscillator may be located in a separate device, such as a separate integrated circuit, with its output signal coupled to the downconversion and filtering block. A local oscillator may be implemented as a digital process, such as an NCO ("numerically controlled oscillator").

In the host platform 902, an application processor 12, such as a microprocessor with supporting memory and software, receives satellite assist data 10, such as almanac and timing data, from a secondary/slave transmitter, i.e., an external wireless source, by means of a receiver (not shown). Employing a satellite orbit model 11 and the timing data, the application processor computes parameters sufficient for the GPS/Galileo receiver 901 to determine the modulation bit sequence for a particular satellite whose signal the GPS/Galileo receiver 901 is attempting to acquire. Parameters sufficient to define in real time the modulation data overlay bit sequence for the particular satellite signal are coupled to the modulation data block 14. In this manner, the GPS/Galileo receiver is able to utilize an extended coherent integration interval longer than the 20 ms frame length of a GPS signal, and to coherently integrate past a changing modulation data bit.

The structure and operation of an embodiment of a detection process for a received signal including a feedback mechanism to adjust the frequency of a local oscillator is described in co-pending U.S. application Ser. No. 12/326, 669, entitled "Adaptive Correlation for Detection of a High-Frequency Signal," filed on Dec. 2, 2008, which is hereby incorporated herein by reference.

Thus, a receiver has been described that may be used to acquire and detect a received signal in a low signal-to-noise ratio environment. The concept has been introduced of providing a receiver including a data source configured to produce a replica of a data bit sequence modulated on a CDMA ("code division multiple access") signal, and a coherent integration stage configured to coherently integrate the CDMA signal over a first period of integration employing the replica of the data bit sequence. In an embodiment, the data source is configured to produce the replica of the data bits employing a signal received from an external wireless source modulated with the data bits. In an embodiment, the signal received from the external wireless source is received on a frequency different from a carrier frequency of the CDMA signal.

In an embodiment, the replica of the data bit sequence modulated on the CDMA signal is produced in the receiver employing assist data received from an external wireless source. In an embodiment, the assist data includes a satellite almanac and a timing reference.

In a further embodiment, a downconversion stage is configured to convert the CDMA signal to a baseband signal, and a frequency estimation stage is configured to produce a frequency correction signal for a local oscillator to produce a frequency-corrected local oscillator signal. The coherent integration stage is configured to coherently integrate the CDMA signal over a second period of integration employing the replica of the data bit sequence modulated on the CDMA signal and the frequency-corrected local oscillator signal. In an embodiment, the coherent integration stage is configured to coherently re-integrate the CDMA signal over the first period of integration employing the replica of the data bits and the frequency-corrected local oscillator signal. In an embodiment, the receiver is a global navigation satellite system receiver.

Another exemplary embodiment provides a receiver including a modulation data overlay source configured to produce real-time modulation data for a CDMA signal in a selected GNSS ("global navigation satellite system") subframe of the CDMA signal. The real-time modulation data is produced employing previously stored satellite data or assist data, wherein producing the real-time modulation data is initiated upon receipt of a timing signal from an external wireless source. The receiver includes a coherent integration stage configured to coherently integrate the CDMA signal over a first period of integration employing the real-time modulation data. In an embodiment, the previously stored satellite data or assist data includes almanac data. In an embodiment, the previously stored satellite data or assist data includes previously stored satellite modulation data from a previously transmitted Galileo or GPS ("Global Positioning System") subframe.

In an embodiment, the previously stored satellite modulation data includes data received from the external wireless source with an external wireless source carrier frequency different from a carrier frequency of the CDMA signal. In an embodiment, the selected GPS subframe includes at least one of GPS subframe 4 and GPS subframe 5.

Another exemplary embodiment provides a method of producing a replica of data bits modulated on a CDMA signal, and coherently integrating the CDMA signal over a first period of integration employing the replica of the data bits. In an embodiment, the method includes producing the replica of the data bits employing a signal received from an external wireless source modulated with the data bits. In an embodiment, the signal received from the external wireless source is received on a frequency different from a carrier frequency of the CDMA signal.

In an embodiment, the replica of the data bits is produced employing assist data received from an external wireless source. In an embodiment, the assist data includes a satellite almanac and a timing reference. In an embodiment, the method further includes converting the CDMA signal to a baseband signal, producing a frequency correction signal for a local oscillator, and coherently integrating the CDMA signal over a second period of integration employing the replica of the data bits and a local oscillator signal with a frequency corrected by the frequency correction signal. In an embodiment, the CDMA signal is a global navigation satellite system signal.

Another exemplary embodiment provides a method of receiving a CDMA signal. The method includes producing real-time modulation data in a selected subframe of the CDMA signal from previously stored satellite data or assist data upon receipt of a timing signal from an external wireless source. The method includes coherently integrating the CDMA signal over a first period of integration employing the real-time modulation data.

In an embodiment, the previously stored satellite data or assist data includes almanac data. In an embodiment, the previously stored satellite data or assist data includes previously stored satellite modulation data from a previously transmitted subframe.

In an embodiment, the previously stored satellite modulation data includes data received from the external wireless source with an external wireless source carrier frequency different from a carrier frequency of the CDMA signal. In an embodiment, the selected subframe comprises at least one of a GPS ("global positioning system") subframe 4 and GPS subframe 5.

Although processes to acquire and detect a received signal in a low signal-to-noise ratio environment and related methods have been described for application to a Galileo or GPS receiver, it should be understood that other applications of these processes such as for other RF signal receivers are contemplated within the broad scope of the invention, and need not be limited to Galileo or GPS applications employing processes introduced herein.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A receiver, comprising:
a data source configured to produce a replica of a data bit sequence and modulate the replica of the data bit sequence with a CDMA ("code division multiple access") signal received from a first wireless signal source; and
a coherent integration stage configured to coherently integrate the CDMA signal over a first period of integration employing the replica of the data bit sequence, wherein the data source is configured to produce the replica of the data bit sequence based on data received from an external wireless source different from the first wireless signal source, and wherein the replica of the data bit sequence is based on assist data comprising satellite almanac data and a timing reference received from the external wireless source.

2. The receiver as claimed in claim 1, wherein the signal received from the external wireless source is received on a frequency different from a carrier frequency of the CDMA signal.

3. The receiver as claimed in claim 1, further comprising:
a downconversion stage configured to convert the CDMA signal to a baseband signal; and
a frequency estimation stage configured to produce a frequency correction signal for a local oscillator to produce a frequency-corrected local oscillator signal, wherein the coherent integration stage is configured to coherently integrate the CDMA signal over a second period of integration employing the replica of the data bit sequence modulated on the CDMA signal and the frequency-corrected local oscillator signal.

4. The receiver as claimed in claim 3, wherein the coherent integration stage is configured to coherently re-integrate the CDMA signal over the first period of integration employing the replica of the data bits and the frequency-corrected local oscillator signal.

5. The receiver as claimed in claim 1, wherein the receiver is a global navigation satellite system receiver.

6. The receiver as claimed in claim 1, wherein the first wireless signal source is a navigation satellite and the external wireless source is a slave satellite data transmitter.

7. The receiver as claimed in claim 1, wherein the first wireless signal source is a satellite and the external wireless source is terrestrial signal source.

8. A method comprising:
producing a replica of a data bit sequence modulated on a CDMA signal received from a first wireless source, wherein the replica of the data bit sequence is based on assist data comprising satellite almanac data and a timing reference received from an external wireless source different from the first wireless signal source; and
coherently integrating the CDMA signal over a first period of integration employing the replica of the data bit sequence.

9. The method as claimed in claim 8, wherein the replica of the data bit sequences is modulated with data bits received from the first wireless source.

10. The method as claimed in claim 9, wherein the signal received from the external wireless source is received on a frequency different from a carrier frequency of the CDMA signal.

11. The method as claimed in claim 8, further comprising:
converting the CDMA signal to a baseband signal;
producing a frequency correction signal for a local oscillator; and
coherently integrating the CDMA signal over a second period of integration employing the replica of the data bit sequences and a local oscillator signal with a frequency corrected by the frequency correction signal.

12. The method as claimed in claim 8, wherein the CDMA signal is a global navigation satellite system signal.

13. The method as claimed in claim 8, wherein the first wireless signal source is a navigation satellite and the external wireless source is a slave satellite data transmitter.

* * * * *

UNITED STATES PATENT AND TRADEMARK OFFICE
CERTIFICATE OF CORRECTION

PATENT NO.        : 8,547,950 B2                                Page 1 of 1
APPLICATION NO.   : 12/434802
DATED             : October 1, 2013
INVENTOR(S)       : Mikael Hjelm It is certified that error appears in the above-identified patent and that said Letters Patent is hereby corrected as shown below:

In the Claims
In Col. 14, line 27, claim 9, delete "sequences" and insert --sequence--.
In Col. 14, line 39, claim 11, delete "sequences" and insert --sequence--.

Signed and Sealed this
Fourth Day of February, 2014

Michelle K. Lee
*Deputy Director of the United States Patent and Trademark Office*